Feb. 7, 1933. G. LINKE 1,896,712
OSCILLATION GENERATOR FOR SIEVES, TROUGHS, AND LIKE APPARATUS
Filed July 22, 1931 2 Sheets-Sheet 1
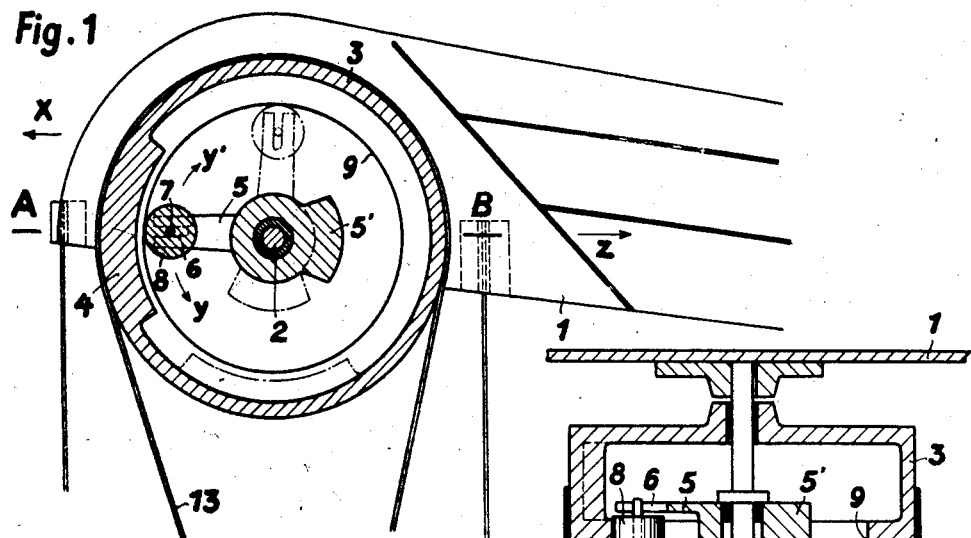
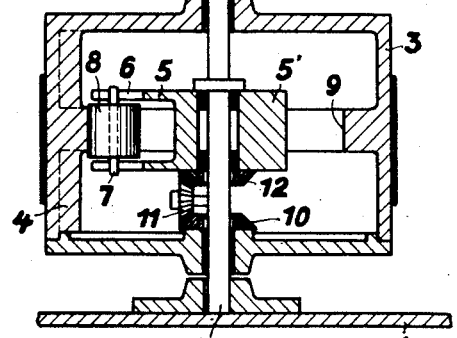
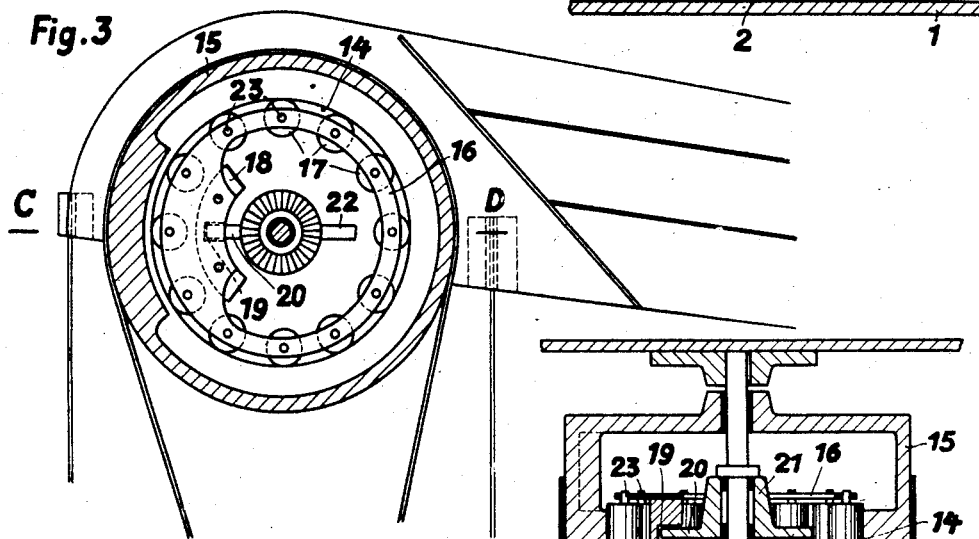
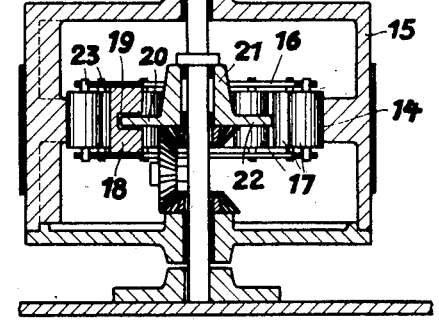
Inventor:
Gerhard Linke
By Knight Bros.
Attys.

Feb. 7, 1933.  G. LINKE  1,896,712
OSCILLATION GENERATOR FOR SIEVES, TROUGHS, AND LIKE APPARATUS
Filed July 22, 1931  2 Sheets-Sheet 2
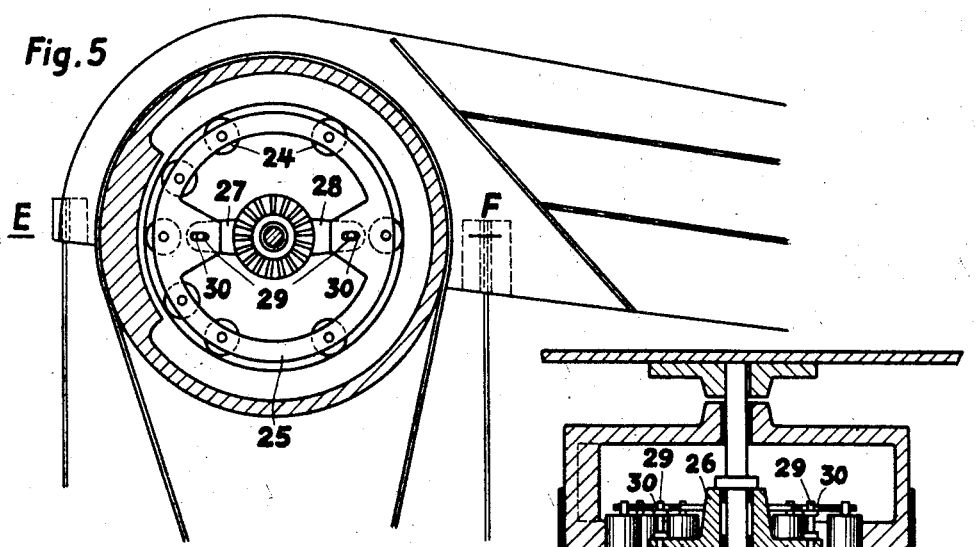
Fig.5
Fig.6
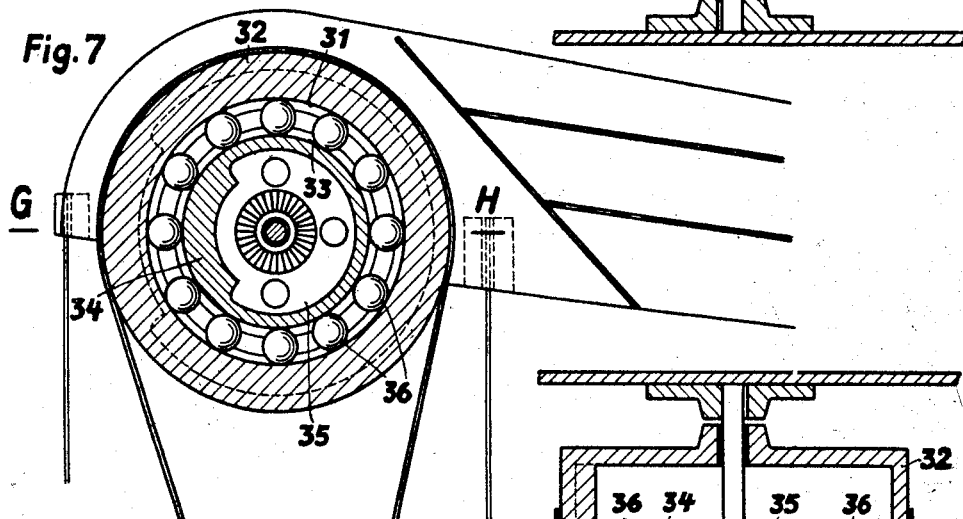
Fig.7
Fig.8
Inventor.
Gerhard Linke
By Knight Bros.
attys Patented Feb. 7, 1933

1,896,712

UNITED STATES PATENT OFFICE

GERHARD LINKE, OF MAGDEBURG, GERMANY, ASSIGNOR TO THE FIRM FRIED. KRUPP GRUSONWERK AKTIENGESELLSCHAFT, OF MAGDEBURG-BUCKAU, GERMANY

OSCILLATION GENERATOR FOR SIEVES, TROUGHS, AND LIKE APPARATUS

Application filed July 22, 1931, Serial No. 552,529, and in Germany July 11, 1930.

This invention relates to apparatus for producing oscillations or vibrations in reciprocating plants of all kinds, and in particular for sieves, troughs and like appliances for sorting, conveying and preparing materials. The vibration generator is provided with two balance weights, which have different directions of rotation but the same angular velocity so that the balance weights operate in the same direction in relation to each other at two diametrically opposed points and in opposite directions at two points at right angles to the first mentioned points. Due to this arrangement, little or no centrifugal action of the balance weights arises, so that a continuously changing and strong stressing of the means carrying the oscillating part of the apparatus, such for example as supporting springs or suspensory pendulums, in a direction at right angles to the plane of vibration is avoided. In the vibration generators hitherto known the centrifugal forces can only act upon each other indirectly through the driving and bearing parts of the balance weights. Thus the alternate accumulation and removal of the centrifugal forces during working takes place through the medium of such parts which, in consequence, are subjected to unusually great stresses and therefore must be made correspondingly strong. The chief object of the invention is to eliminate this disadvantage.

According to the invention one balance weight is so mounted as to be independent of the shaft carrying the apparatus and acts either as a rolling body directly or by the agency of rolling bodies upon that part of the apparatus carrying the other balance weight.

The accompanying drawings represent four examples of the invention as applied to means for driving a sieve.

Figures 1, 3, 5 and 7 are in each case a vertical section of the driving gear, and Figures 2, 4, 6 and 8 are in each case a section corresponding to the lines A—B, C—D, E—F and G—H of Figs. 1, 3, 5 and 7, respectively.

In the apparatus according to Figures 1 and 2, in the frame of the sieve 1 there is non-rotatably mounted a shaft 2, upon which is rotatably pivoted a housing 3. The housing 3 serves as a pulley and is provided at its inner wall with a balance weight 4. At the centre of the shaft 2 and within the housing, is pivoted a bifurcated guide arm 5, which is raised by means of a counter-weight 5'. In radially directed slots 6 in the arm 5 is guided the axle 7 of a balance weight 8 fashioned as a roller. The roller 8 rolls during working in a peripheral path 9 formed by an internal rib of the housing 3. The guide arm 5 is driven from the housing 3 by means of bevel wheels 10, 11 and 12. The bevel wheel 10 is fastened to the housing 3 and transmits its rotation through the bevel wheel 11 mounted upon the fixed shaft 2 to the bevel wheel 12 connected with the guide arm 5. The bevel wheels 10 and 12 are of uniform size. The guide arm 5 consequently turns in a direction opposite to that of the housing 3, but with the same angular velocity. The driving of the device is effected by means of a belt 13 running upon the external periphery of the housing 3. The rocking of the device in undesired directions is precluded by the fact that the centers of gravity of the weights 4 and 8 operate in a common plane.

In the position of the balance weights 4 and 8 shown in full lines (Fig. 1), they lie in the same direction, namely in the direction of the arrow $x$. Upon further rotation of the housing 3 to the extent of 90° in the direction of the arrow $y$ the balance weight 4 passes into the position shown in dot and dash lines in the lower part of Figure 1 while the guide arm 5 turns in the direction of the arrow $y'$ and consequently brings the balance weight 8 into the position opposed to the balance weight 4 as shown in dot and dash lines in the upper part of Figure 1. In this position with similar dimensioning of the balance weights the centrifugal forces become annulled. If the balance weights be turned to the extent of a further 90° then they both work in the same direction, namely in the direction of the arrow $z$. If turned by a further 90° the balance weights again work in opposite directions and so on.

Due to the fact that with this drive one balance weight, namely the roller 8, acts directly upon the carrier, and the other balance weight 4 acts upon the housing 3, those parts which carry the roller 8 are either entirely free from the effect of the centrifugal force or they are stressed in a far more favourable manner than has hitherto been usually the case. Thus in the present case the guide arm and its bearings remain entirely unaffected by the centrifugal force of the roller 8; consequently the centrifugal force also does not attack, as heretofore, the bearing point of the arm carrying one of the balance weights, that is to say, the centre of the shaft 2, but the action of the centrifugal force of both weighs is taken up by the bearings of the housing 3, which bearings lie directly contiguous to the shaft bearings in the sieve frame, so that, therefore, practically no bending momentum at all is exerted upon the shaft 2. Owing to the elimination of the centrifugal force moments from the bearing and driving parts lying in the housing 3 an easy running, free from interference, of the apparatus is ensured. The entire driving mechanism may also be made weaker and lighter in construction than has heretofore been the case.

In the example according to Figures 3 and 4, within the circular path or rib 14 of the housing 15 is mounted a crown of rollers 17 carried by a cage or annular frame 16. Upon the cage 16 is mounted a balance weight 18, which is provided with a recess, for example a hole 19, in which rests one arm 20 of a driving member 21. The other arm 22 of the driving member serves merely for balancing the arm 20. In other respects the type of construction represented coincides with that according to Figures 1 and 2. Due to the use of a complete crown of rollers, an extended and secure bearing for the inner balance weight is obtained. Furthermore with this constructional form, the bevel wheel connected with the driving member can be moved towards the middle so that, consequently, either more space is obtained for the bevel wheel gear or the housing can be kept smaller.

In this example the centrifugal force effect of the balance wheel 18 is taken up by the roller axes 23. The roller axes must consequently be made very strong and be well lubricated. Should this cause difficulties they can be avoided by means of the constructional form of apparatus shown in Figures 5 and 6. In this example a crown of rollers 24 is also disposed within the circular path of the housing, said crown of rollers being carried by a cage 25. This constructional form differs from that according to Figures 3, 4 in particular due to the fact that no special balance weight carried by the roller is present as with the previous construction, but a similar object is obtained due to the fact that the crown of rollers at one part of its periphery has a larger number of rollers. Owing to the direct contact of the rollers with the circular path, the roller axes are free of the effects of centrifugal force.

The driving member 26 has two arms 27 and 28 which engage with the roller cage 25, through the agency of pins 29. These pins 29 lie in radial slots 30 so that any movement of the crown of rollers caused by the centrifugal force action or by any play between the crown of rollers and the circular path, can take place without influencing the driving member and the shaft.

Figures 7 and 8 show a further example. Instead of the rollers, balls 36 are provided, which run between the circular path 31 of the housing 32 and a ball race 33 formed in the disc 35 carrying the inner balance weight 34. Whereas in the preceding constructional examples the guide arm and the driving member are so journalled upon their shafts that an axial displacement of the parts rotating in the housing is prevented, in the constructional example according to Figures 7 and 8 this journalling is superfluous because any axial pressure is taken up by the balls. The disc 35 is mounted upon the shaft with a certain amount of play.

This type of construction which, moreover, coincides with that previously described has the advantage that with the abolition of the bearing all the difficulties attending the lubrication of this bearing are obviated. Between the housing 32 and the disc 35 an independent ball bearing may also be provided, so that in the case of wear and tear neither the housing nor the disc will be effected but only the exchange of the ball bearing will be necessary.

Instead of the rollers or balls use could be made of other devices, such as barrel-shaped rolling bodies, which also take up the axial pressure.

Other constructional forms are also possible, bearing in mind that it is essential that the arrangement should be so carried out that the effects of the centrifugal force developed by both balance weights are taken up by one common part, in which the effects are negatived, annulled or accumulated.

The subject matter of the invention is intended to find use especially in preparatory work; it is also however, to be used with advantage in connection with all reciprocating apparatus, for example in connection with apparatus for packing loose material.

What I claim is:

1. In combination with reciprocating apparatus, of a vibration generator comprising a shaft fixed to said reciprocating apparatus, a hollow cylindrical housing rotatably mounted upon said shaft, a balance weight fixed to said housing at the interior thereof, means for rotating said housing, a second balance weight rotatably mounted upon said shaft in the inerior of said housing, a bevel gear assembly intermediate said housing and said second balance weight whereby said last-mentioned weight is rotated by said housing and maintained in definite relationship with said first balance weight upon said housing, said rotation imparted to said second balance weight being of the same angular velocity and in an opposed direction with respect to that of said first balance weight.

2. In combination with reciprocating apparatus, of a vibration generator comprising a shaft fixed to said reciprocating apparatus, a hollow cylindrical housing rotatably mounted upon said shaft, a balance weight fixed to said housing at the interior thereof, means for rotating said housing, an arm rotatably mounted upon said shaft in the interior of said housing, a roller serving as a second balance weight at the extremity of said arm, a circumferential rib at the interior of said housing for guiding said roller, bevel gears of the same diameter connected coaxially with said shaft to said housing and said arm, a coupling gear intermediate said bevel gears, said balance weights being so arranged that upon rotation of said housing said weights rotate in oposite directions at the same angular velocity, with said weights extending in the same direction at two diametrically opposed points in the line of vibrating movement, and in opposite directions in a line perpendicular to said line of movement.

3. In combination with reciprocating apparatus, of a vibration generator comprising a shaft fixed to said reciprocating apparatus, a hollow cylindrical housing rotatably mounted upon said shaft, a balance weight fixed to said housing at the interior thereof, means for rotating said housing, a bifurcated arm rotatably mounted upon said shaft in the interior of said housing, grooves in the extremities of the branches of said bifurcated arm, a roller serving as a second balance weight disposed in said grooves, a circumferential rib at the interior of said housing for guiding said roller, bevel gears of the same diameter connected coaxially with said shaft to said housing and said arm, a coupling gear intermediate said bevel gears, said balance weights being so arranged that upon rotation of said housing said weights rotate in opposite directions at the same angular velocity, with said weights extending in the same direction at two diametrically opposed points in the line of vibrating movement, and in opposite directions in a line perpendicular to said line of movement.

4. In combination with reciprocating apparatus, of a vibration generator comprising a shaft fixed to said reciprocating apparatus, a hollow cylindrical housing rotatably mounted upon said shaft, a balance weight fixed to said housing at the interior thereof, a flexible transmission member embracing the exterior of said housing for imparting rotation thereto, a guide arm rotatably mounted upon said shaft in the interior of said housing, a roller serving as a second balance weight at the extremity of said arm, transmission gearing intermediate said housing and said guide arm in the interior of the former for coupling said balance weights in a predetermined relationship, whereby the rotation of said housing effects a rotation of said weights in opposite directions at the same angular velocity, with said weights extending in the same direction at two diametrically opposed points in the line of vibrating movement, and in opposite directions in a line perpendicular to said line of movement.

5. In combination with reciprocating apparatus, of a vibration generator comprising a shaft fixed to said reciprocating apparatus, a hollow cylindrical housing rotatably mounted upon said shaft, a balance weight fixed to said housing at the interior thereof, means for rotating said housing, an annular frame rotatably mounted upon said shaft in the interior of said housing, a plurality of bearing rollers mounted in said frame, a circumferential rib at the interior of said housing for guiding said rollers, said frame being weighted at a portion thereof to constitute a second balance weight, and coupling means between said housing and said annular frame whereby the rotation of said housing effects a rotation of said balance weights in opposite directions at the same angular velocity, with said weights extending in the same direction at two diametrically opposed points in the line of vibrating movement, and in opposite directions in a line perpendicular to said line of movement.

6. The combination claimed in claim 5 wherein said last-mentioned coupling means comprises an arm connected to said annular frame, a bevel gear rigidly fixed to said arm, a second bevel gear fixed to said housing coaxially with said first bevel gear and a coupling gear intermediate said bevel gears.

7. The combination claimed in claim 5 wherein said last-mentioned coupling means comprises an arm loosely connected to said annular frame by a pin and slot connection, a bevel gear rigidly fixed to said arm, a second bevel gear fixed to said housing coaxially with said first bevel gear and a coupling gear intermediate said bevel gears.

8. In combination with reciprocating apparatus, of a vibration generator comprising a shaft fixed to said reciprocating apparatus, a hollow cylindrical housing rotatably mounted upon said shaft, a balance weight fixed to said housing at the interior thereof, means for rotating said housing, an annular frame rotatably mounted upon said shaft in the interior of said casing, a plurality of bearing rollers mounted in said frame, a circumferential rib at the interior of said housing for guiding said rollers, said rollers being unequally distributed around said frame whereby a closely disposed group of said rollers constitute a second balance weight, and coupling means between said housing and said annular frame whereby the rotation of said housing effects a rotation of said balance weights in opposite directions at the same angular velocity, with said weights extending in the same direction at two diametrically opposed points in the line of vibrating movement, and in opposite directions in a line perpendicular to said line of movement.

9. In combination with reciprocating apparatus, of a vibration generator comprising a shaft fixed to said reciprocating apparatus, a hollow cylindrical housing rotatably mounted upon said shaft, a balance weight fixed to said housing at the interior thereof, means for rotating said housing, a disc in the interior of said housing concentric to the latter mounted for rotation about said shaft, a second balance weight fixed to said disc, a rolling bearing intermediate the internal periphery of said housing and the external periphery of said disc, and coupling means between said housing and said disc whereby the rotation of said housing effects a rotation of said balance weights in opposite directions at the same angular velocity, with said weights extending in the same direction at two diametrically opposed points in the line of vibrating movement, and in opposite directions in a line perpendicular to said line of movement.

10. In combination with reciprocating apparatus, of a vibration generator comprising a shaft fixed to said reciprocating apparatus, a hollow cylindrical housing rotatably mounted upon said shaft, a balance weight fixed to said housing at the interior thereof, means for rotating said housing, a disc in the interior of said housing mounted with play upon said shaft, a second balance weight fixed to said disc, a rolling bearing intermediate the internal periphery of said housing and the external periphery of said disc, and coupling means between said disc whereby the rotation of said housing effects a rotation of said balance weights in opposite directions at the same angular velocity, with said weights extending in the same direction at two diametrically opposed points in the line of vibrating movement, and in opposite directions in a line perpendicular to said line of movement.

11. In combination with reciprocating apparatus, of a vibration generator comprising a shaft, a balance weight rotatably mounted upon said shaft, means for rotating said balance weight, a second balance weight rotatably mounted upon said shaft in co-operative relationship with said first balance weight so that the loci of the centers of gravity of said weights are in a common plane, and means for rotating said second balance weight by the rotation of said first balance weight at the same angular velocity and in a direction opposite to the direction of rotation of the latter, said balance weights extending in the same direction at two diametrically opposed points in the line of vibrating movement, and in opposite directions in a line perpendicular to said line of movement.

The foregoing specification signed at Berlin, Germany, this 7th day of July, 1931.

GERHARD LINKE.